UNITED STATES PATENT OFFICE.

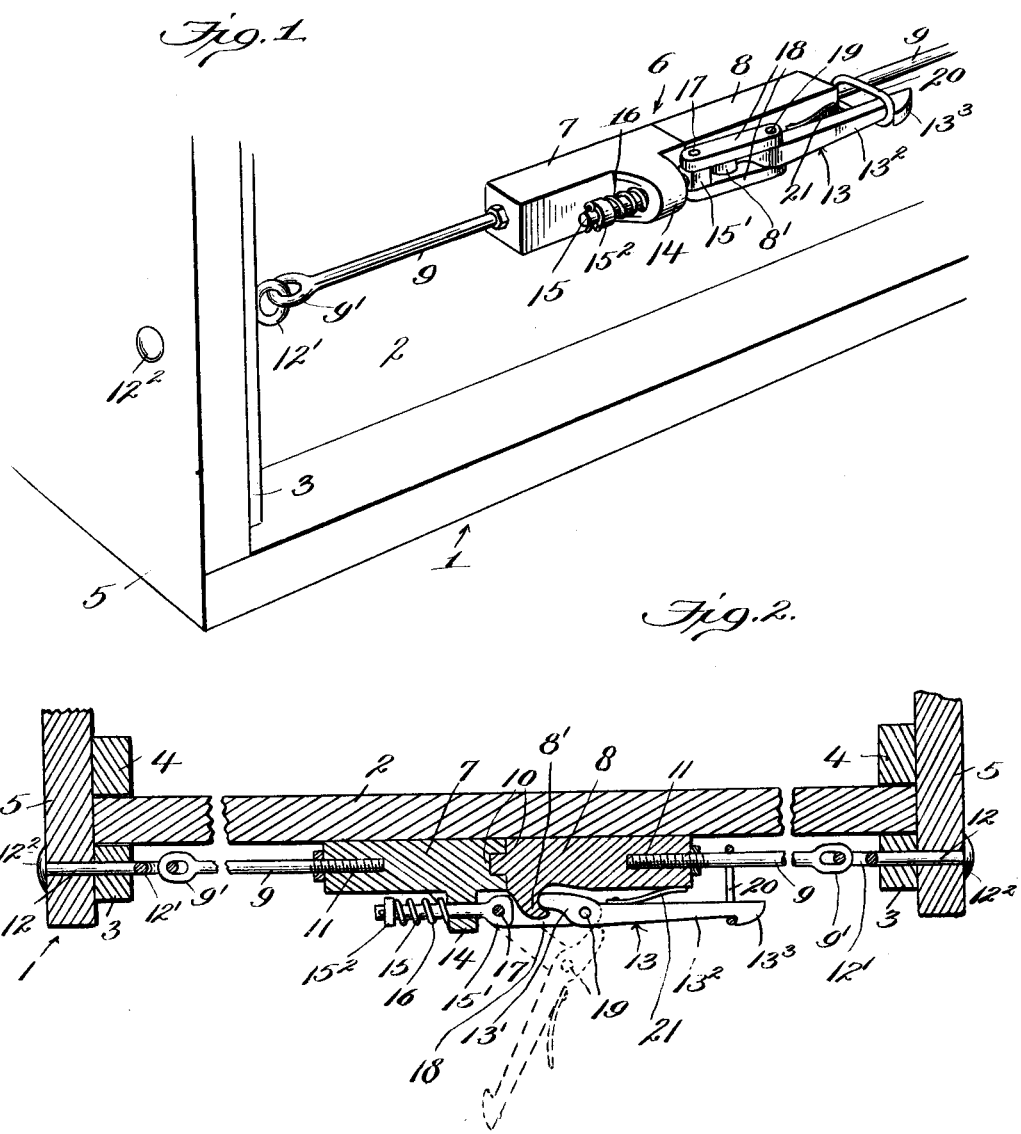

GEORGE W. GILLIAM, OF YALE, VIRGINIA.

END-GATE FASTENER.

1,051,730. Specification of Letters Patent. Patented Jan. 28, 1913.

Application filed June 8, 1912. Serial No. 702,632.

*To all whom it may concern:*

Be it known that I, GEORGE W. GILLIAM, a citizen of the United States, residing at Yale, in the county of Sussex and State of Virginia, have invented new and useful Improvements in End-Gate Fasteners, of which the following is a specification.

The present invention relates to end-gate fasteners, and it resides, briefly, in the production of an improved multi-part device of that type which is so constructed as to exert a bracing action upon the sides of the wagon body, at the ends thereof, for the purpose of holding the end-gate in place; to relieve the strain upon said sides when the wagon body is subjected to any sudden and heavy shock; to permit its application to any ordinary or conventional make of wagon; and to enable it, when applied, to be readily fastened and unfastened.

An embodiment of the invention is illustrated in the accompanying drawing, wherein—

Figures 1 and 2 are, respectively, a fragmental perspective view and a horizontal section showing the practical application of said invention.

In said drawing, 1 indicates, generally, a wagon body, and 2 an end-gate of conventional make, the ends of the gate being slidably fitted in the spaces between the pairs of cleats 3 and 4 which, as is customary, are secured to the inner faces of the sides 5 of the wagon body adjacent to the rear ends thereof.

The fastener 6, (of which, however, more than one is usually employed), connects the terminals of the sides 5 at the rear of the end-gate, but instead of being formed by a single rod, as is frequently the case, this element is of multi-part construction, and comprises, in the embodiment illustrated, a pair of coupling blocks 7 and 8, or their equivalents, which are carried by rods 9. The said blocks are adapted for connection at their confronting inner ends by a groove-and-tenon, or similar joint 10, which admits of ready coupling and uncoupling, and are provided at their outer ends with threaded sockets 11 wherein the inner ends of the rods are adjustably received. The outer ends 9' of said rods are formed as eyes which are loosely engaged with the eyes 12' provided upon the adjacent ends of the fastening bolts 12, the latter passing through the outer cleats 3 and the wagon sides 5 and terminating at their outer ends in heads $12^2$ that engage the said wagon sides, as shown.

The coupling blocks 7 and 8 are drawn together, to exert the requisite pull upon the wagon sides by means of a suitable device, here shown as formed by the lever 13, this lever being connected with one of the blocks and adapted to engage the other block. In the construction illustrated, the left-hand block 7 is provided upon its outer side face with a perforated lug 14 through which slides a bolt 15 arranged parallel with said block, one end of this bolt terminating in a fork 15', while the other end carries a stop $15^2$, an expansible spring 16 being interposed between said stop and lug, for the purpose of normally forcing the bolt toward the left. Fork 15' carries a pin 17, to which are pivoted the inner ends of a pair of links 18, whose outer ends are connected by a pin 19, on which, in turn, the aforementioned lever 13 is pivoted. Said lever is of the two-armed type, its short inner arm 13' being slightly offset from its long outer arm $13^2$, which latter is formed with a terminal hook $13^3$. The first-mentioned lever arm 13' co-acts with and is designed to engage a hooked lateral projection 8' formed upon the outer side face of block 8, the arrangement being such, therefore, as to impart to the lever a cam-like action during its movements into operative and inoperative position, to respectively lock and unlock the coupling blocks.

In order to retain the lever in the former position, means such, for example, as the ring 20 may be provided. This ring is loosely carried by the right-hand bolt 9 and is adapted for engagement by the hooked terminal $13^3$ of the long lever arm $13^2$, a spring 21, or the like, being provided to force the said lever arm, (to which it may be attached), away from block 8 and thus hold the ring against accidental displacement.

The operation of the fastener is believed to be apparent from the foregoing, and for that reason to require no extended description, but it may be stated, however, that the members of the fastener are positively connected at all times to the wagon body, so that there is no danger of the same becoming displaced or lost. Also, the coupling blocks can be readily locked and unlocked by a single movement of the cam lever, which latter is, itself, held in operative position by the coöperation of the spring 21 and ring 20. Finally, the spring 16 carried by pin 15 serves to normally pull said lever toward the left and thus retain its offset inner arm 13' engaged with the hooked projection 8' on block 8, said spring, however, contracting when any heavy shock is imparted to the wagon body, and, in consequence, relieving the strain upon the fastener.

I claim as my invention:

1. A fastener of the character specified comprising, in combination, a pair of coupling blocks, one of which is provided with a projection; a locking device connected with the other block and arranged to engage said projection; a rod connected to each block; an element loosely carried by the rod connected to the first-named block and arranged to engage said locking device; and means interposed between said first-named block and said locking device for retaining said element in such engagement.

2. A fastener of the character specified comprising, in combination, a pair of coupling blocks, one of which is provided with a projection; a locking device connected with the other block and arranged to engage said projection; a rod connected to each block; an element loosely carried by the rod connected to the first-named block and arranged to engage said locking device; and a spring interposed between said first-named block and said locking device for forcing the latter away from the former, to retain said element in such engagement.

3. A fastener of the character specified comprising, in combination, a pair of coupling blocks, one of which is provided with a projection; a locking lever connected with the other block and arranged to engage said projection; a rod connected to each block; a ring loosely carried by the rod connected to the first-named block and arranged to engage one arm of said lever; and a spring interposed between the said first-named block and said lever arm for forcing the latter away from the former, to retain said ring in such engagement.

In testimony whereof I have hereunto set my hand in presence of two subscribing witnesses.

GEORGE W. GILLIAM.

Witnesses:
A. W. PARKER,
W. D. MAGEE.

Copies of this patent may be obtained for five cents each, by addressing the "Commissioner of Patents, Washington, D. C."